US007681487B2

(12) United States Patent
Galba

(10) Patent No.: US 7,681,487 B2
(45) Date of Patent: Mar. 23, 2010

(54) TANDEM AXIAL PISTON PUMP UNIT

(75) Inventor: Vladimir Galba, Nova Dubnica (SK)

(73) Assignee: Poclain Hydraulics, Verberie Cedex (FR)

( * ) Notice: Subject to any disclaimer, the term of this patent is extended or adjusted under 35 U.S.C. 154(b) by 554 days.

(21) Appl. No.: 11/199,346

(22) Filed: Aug. 8, 2005

(65) Prior Publication Data

US 2007/0022751 A1 Feb. 1, 2007

(30) Foreign Application Priority Data

Jul. 27, 2005 (EP) .................................. 05291601

(51) Int. Cl.
*F01B 13/04* (2006.01)
(52) U.S. Cl. .......................................... 92/12.2; 91/499
(58) Field of Classification Search .............. 60/484, 60/486; 91/12.2, 499; 92/499, 12.2, 71; 403/359.1, 359.2, 359.6
See application file for complete search history.

(56) References Cited

U.S. PATENT DOCUMENTS

| 3,036,434 | A | | 5/1962 | Mark |
| 4,002,029 | A | * | 1/1977 | Jones .......................... 60/458 |
| 4,232,587 | A | | 11/1980 | Kline |
| 4,437,389 | A | * | 3/1984 | Kline .......................... 91/499 |
| 5,571,001 | A | * | 11/1996 | Fukuda et al. ............ 417/423.3 |
| 5,800,134 | A | | 9/1998 | Hasegawa et al. |
| 6,487,856 | B1 | * | 12/2002 | Ohashi et al. ................. 60/484 |
| 6,494,686 | B1 | * | 12/2002 | Ward .......................... 417/269 |
| 6,599,091 | B2 | * | 7/2003 | Nagle .......................... 415/229 |
| 2004/0175275 | A1 | * | 9/2004 | Ohashi et al. ............. 417/222.1 |

FOREIGN PATENT DOCUMENTS

| DE | 42 25 380 | 2/1994 |
| DE | 198 28 180 | 1/2000 |
| JP | 09 177668 | 7/1997 |

* cited by examiner

*Primary Examiner*—Michael Leslie
(74) *Attorney, Agent, or Firm*—Ladas & Parry LLP

(57) ABSTRACT

A hydraulic machine (60, 70) comprising a housing (12, 14, 16) and at least first and second hydraulic units. Each unit comprising a cylinder block (36A, 36B) located in the housing and having pistons (42), and a shaft (18, 20) in rotational engagement with the cylinder block (36A, 36B). The shafts (18, 20) being arranged coaxially and being coupled so as to rotate together. The machine (60, 70) further comprising bearings (30, 32, 34, 71) for supporting the shafts (18, 20) in the housing (12, 14, 16). The shafts (18, 20) are coupled by corresponding male and female splined end portions (18A, 20A) thereof engaged one in the other, and the bearings (30, 32, 34, 71) comprise first and second bearings (30, 32) for respectively supporting the shafts (18, 20) at portions thereof located on the other sides of the cylinder blocks (36A, 36B) with respect to said splined end portions (18A, 20A). A single third bearing arrangement (34, 71) engages one of the shafts (18, 20) at least in the vicinity of the splined end portion (18A, 20A) thereof thereby supporting the shafts (18, 20) between said cylinder blocks (36A, 36B).

14 Claims, 4 Drawing Sheets

TANDEM AXIAL PISTON PUMP UNIT

FIELD OF THE INVENTION

The present invention relates to a hydraulic machine. In particular, the present invention relates to a compact tandem axial piston pump unit with inclined swash plates.

BACKGROUND OF THE INVENTION

Known compact tandem pumps of axial piston configuration, with swash plates and coaxially arranged shafts are designed with the two ends of the pump housing being similar or identical to the front housing of a standard single pump. Between the two end portions of the housings a single or a double mid-housing is inserted in which an auxiliary pump can also be mounted.

The shafts of both pumps and their corresponding cylinder blocks are supported by independent bearings. Accordingly, a bearing is arranged in each of the two end housings and two bearings are arranged in the mid-housing. Each shaft typically has a splined end in the mid housing area and both splined ends are in engagement with a separate splined hollow coupling member to permit torque transmission between the two pumps.

An example of this type of arrangement is disclosed in DE 198 28 180. In that reference the shafts 4 and 5 of the first and second hydraulic pumps 2, 3 are engaged by an additional coupling member 28, and the shafts are supported by four bearings 8, 9, 11, 12.

A similar arrangement is disclosed in JP 9177668. As shown in FIG. 1 of that document, male and female portions of the first and second shafts 24A, 24B form a direct intermeshing connection in the mid housing, such that a separate coupling member is not required. The shafts 24A, 24B are supported by two bearings 38, 39 in two housing end radial covers, and two further bearings 31, 34 in the mid housing region.

One disadvantage of these arrangements relates to the large number of parts required for radial bearing of the shafts and for effecting torque transmission between them. This results in increased manufacturing costs and the overall axial length of the tandem pump assembly is large.

The excessive length of the pump assembly adds to the overall weight of the pump unit, and hence requires additional material during production. These factors contribute to increased manufacturing and operating costs of the pump unit.

Another known arrangement of compact tandem axial pumps utilises two cylinder blocks on a same shaft, which is radially mounted on two bearings. For example, this type of arrangement is shown in DE 42 25 380. In this prior art document, as can be seen in FIG. 1 for example, a primary pump 1 and a secondary pump 12 are both mounted on a single input shaft 2. However, such arrangements are suitable only for lower operating pressures and small displacements of the pumps.

It is an object of the present invention to provide a tandem axial piston pump unit which has a reduced axial length, and/or reduced weight and/or is of a simplified design to conventional tandem axial pump units.

SUMMARY OF THE INVENTION

A hydraulic machine comprising a housing and at least first and second hydraulic units, each unit comprising a cylinder block located in the housing and having pistons, and a shaft in rotational engagement with the cylinder block, said shafts being arranged coaxially and being coupled so as to rotate together, the machine further comprising bearings for supporting the shafts in the housing, wherein the shafts are coupled by corresponding male and female splined end portions thereof engaged one in the other, and the bearings comprise first and second bearings for respectively supporting the shafts at portions thereof located on the other sides of the cylinder blocks with respect to said splined end portions and, a single third bearing arrangement engages one of the shafts at least in the vicinity of the splined end portion thereof thereby supporting the shafts between said cylinder blocks.

Advantageously, the first hydraulic unit includes a first swash plate, and the second hydraulic unit includes a second swash plate and each piston is connected to one of said first and second swash plates and adapted to reciprocate on an axis parallel to the axis of the shafts. Each hydraulic unit is thus of an axial piston type.

Preferably, each swash plate is adapted to be axially inclined relative to the rotational axis of the shafts.

Preferably, the angle of inclination $+\beta$ of the first swash plate is opposite to the angle of inclination $-\beta$ of the second swash plate.

Preferably each hydraulic unit is a pump.

Preferably, the third bearing arrangement supports the shaft comprising the female splined portion at a coupling region of the first and second shafts.

Preferably, the first swash plate is located between the first bearing and the first cylinder block, and the second swash plate is located between the third bearing and the second cylinder block.

Advantageously, the housing comprises three parts, each part providing a seat for one of the first, second and third bearings.

An advantage of the tandem axial piston pump unit of the present invention is a reduction of the overall assembly length, a reduction of weight, and a reduction in manufacturing costs. This results from the reduced number of manufactured parts and the reduced material consumption.

Another advantage of the present invention is an improvement of the dynamic behavior of the combustion engine and tandem pump connection when mounted in a machine frame or a vehicle chassis. Lifetime of the central bearing can also be increased.

Due to the use of a single central bearing for both shafts, the overall length (Ls) of the tandem pump unit is shortened such that for equal displacements, the total length is significantly less than twice the length of a single pump of prior art design.

DETAILED DESCRIPTION OF THE PREFERRED EMBODIMENTS

The invention will now be described by way of example with reference to the accompanying drawings.

Figure 1:
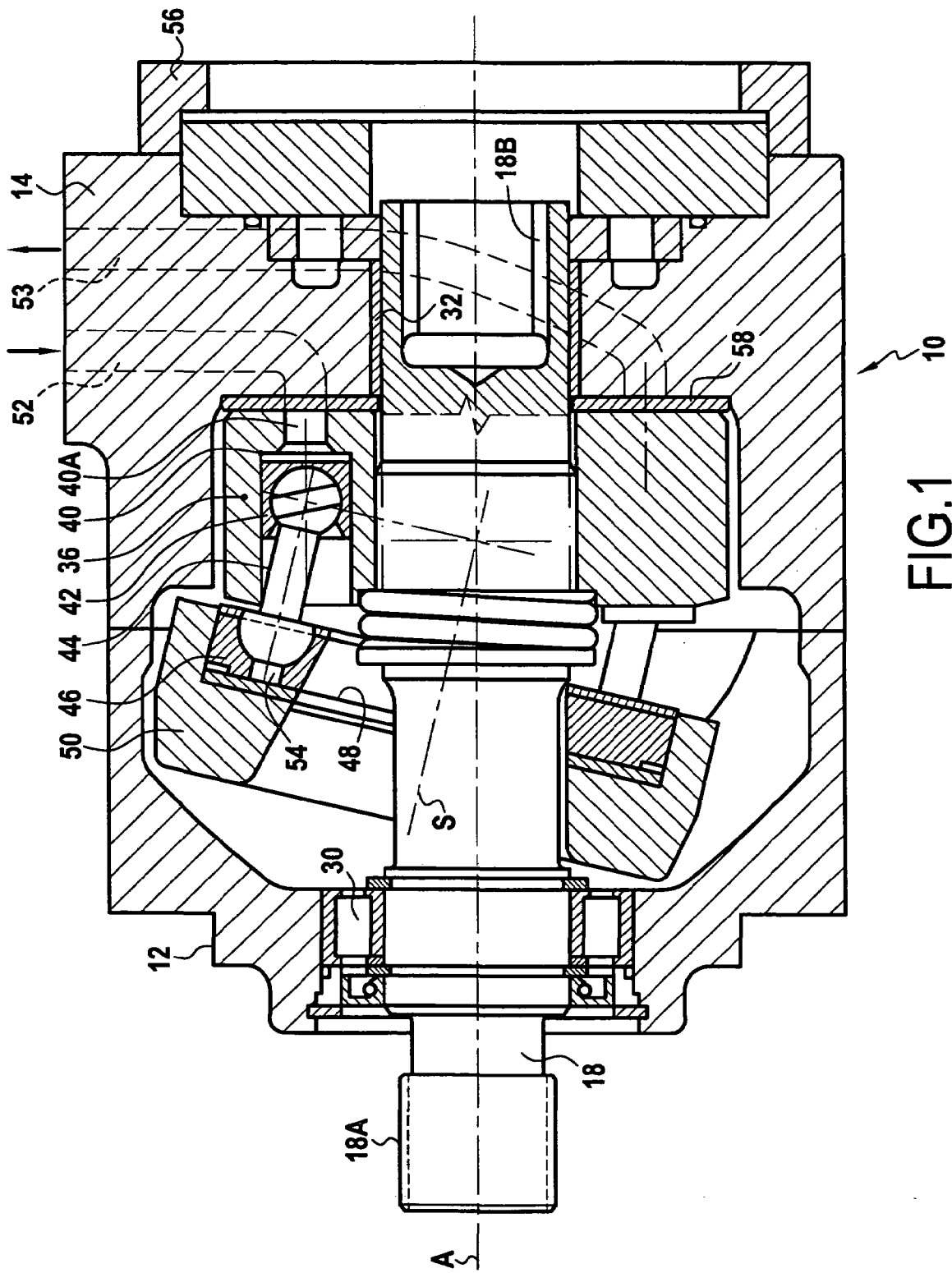
FIG. 1 is a cross-sectional view showing a single axial pump unit suitable for use in a tandem axial pump according to the invention.

FIG. 1 shows a hydraulic machine in the form of a single axial piston pump unit indicated by the reference numeral 10. The housing structure of the pump unit 10 is formed by a first housing member 12 and a second housing member 14. The two housing members 12, 14 are connected together forming a central cavity therein. The two housing members 12, 14 encase a cylinder block 36 driven by a shaft 18, and a swash plate 50, so as to form a hydraulic unit such as a hydraulic pump.

The shaft 18 which is connectable to an internal combustion engine (not shown) or other such power source, is mounted inside the cavity formed by the connected first and second housing members 12, 14. A first end of the shaft 18 is mounted inside the first housing member 12 on a first bearing 30, and the second end of the shaft 18 is mounted inside the second housing 14 on a second bearing 32. In the example shown in FIG. 1, the first bearing 30 is a roller bearing, and the second bearing 32 is a sliding bearing. In this example, these two bearings are radial bearings. Roller bearing 30 has capability to transfer also force in axial direction.

The cylinder block 36 is radially mounted on the shaft 18. The cylinder block 36 is arranged to rotate with the shaft 18, via respective splines of the central part of the shaft 18 and of the central cavity of the cylinder block 36. The cylinder block 36 has one or more cylinders 40 machined therein. Each cylinder 40 is axially parallel to the axis A of rotation of the shaft 18.

Each cylinder 40 houses a piston 42 which is pivotally connected to a piston rod 44 by means of a first spherical joint. The piston rod 44 is pivotally connected at its other end to a sliding plate 46 by a second spherical joint ending by a synchronisation pin 54. The synchronisation pin 54 cooperates with a synchronisation hole (not labeled) formed in the sliding plate 46.

The sliding plate is mounted on a thrust plate 48, and the sliding plate 46 is adapted to rotate relative to the thrust plate 48. The thrust plate 48 is immovably mounted on the swash plate 50, which is secured against rotation around axis A, inside the central cavity of the housings 12, 14, while being inclined with respect to the shaft 18. A symmetrical axis S of the swash plate is inclined with respect to the axis A. This inclination is advantageously variable.

The housing 12, 14 comprises two main ports 52, 53 respectively for feed and exhaust of fluid.

A plate 58 is located between the cylinder block 36, and the second housing member 14 for accommodating said cylinder block 36. The ports 52, 53 terminate at the plate 58, and the plate 58 contains holes therein which are in fluid communication with the ends of the ports 52, 53.

When the cylinder block 36 rotates, the cylinder conduits 40A successively come in communication with said holes of plate 58, thereby enabling inflow and outflow of the cylinders under the effect of the piston's reciprocating displacement, due to their reaction with the swash plate.

A flange 56 is externally mounted to the second housing member 14. The shaft 18 has a splined hollow portion 18B formed in the second end thereof, and the hollow portion is externally accessible from the outside of the pump unit 10, through the flange 56. The shaft 18 has its first end forming a splined male portion 18A for connection to the driving device.

Figure 2:
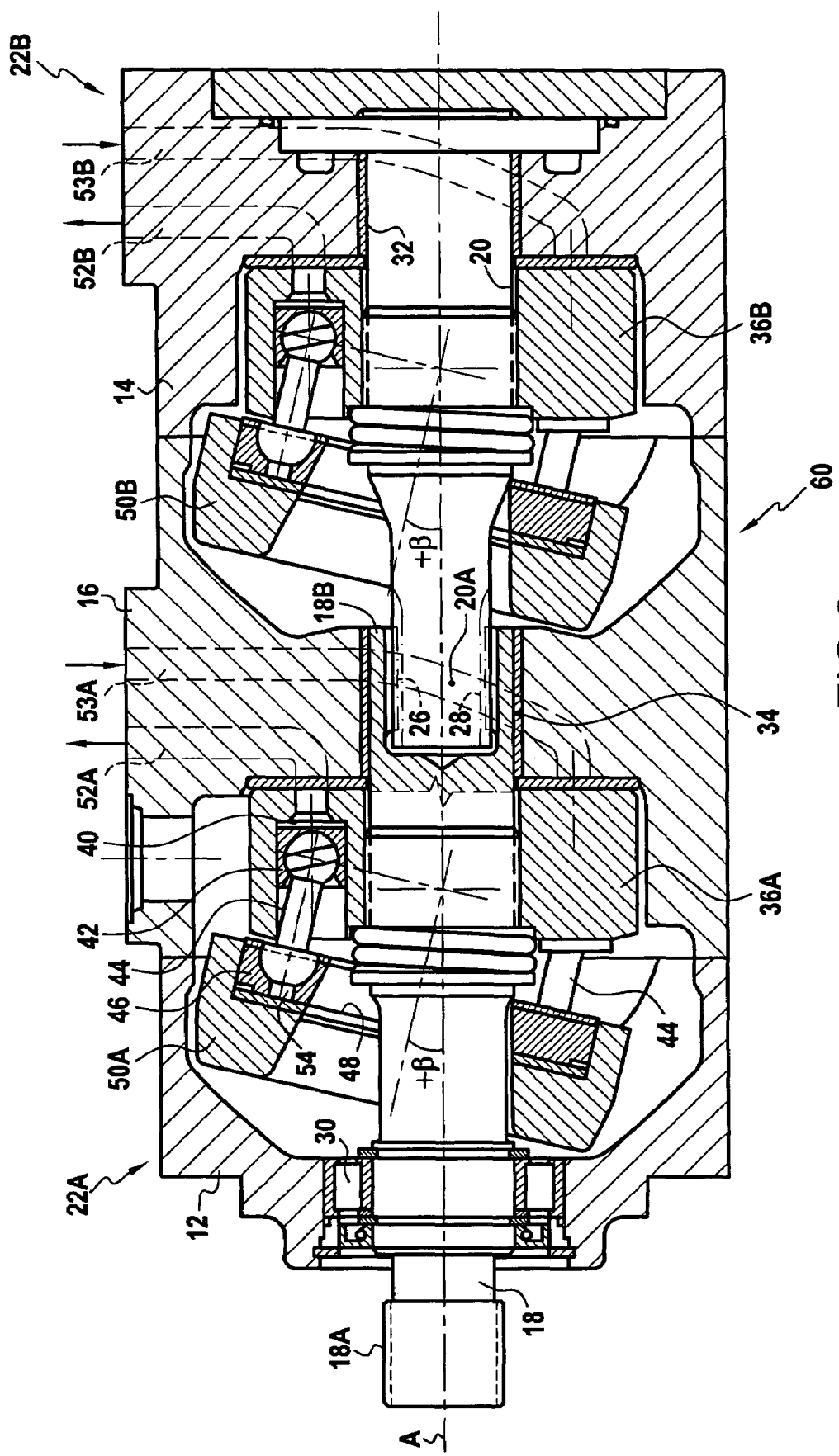
FIG. 2 is a cross-sectional view of a tandem axial piston pump according to a first embodiment of the invention.

A first embodiment of the invention shown in FIG. 2 includes a tandem axial piston pump unit indicated by the reference numeral 60. Where relevant, like reference numerals have been used to indicate like components to the above discussed pump unit 10. The embodiment of FIG. 2 includes two pumps 22A, 22B.

The housing structure for the tandem pump unit 60 is formed by a first housing member 12, a second housing member 14 and a central housing member 16 located therebetween. The three housing members 12, 14, 16 are connected together forming a central cavity therein. The first and second housing members 12 and 14 are similar to those described above with reference to FIG. 1, concerning the single pump unit 10.

A first shaft 18 which is connectable to an internal combustion engine or other such power source (not shown) via its first end 18A, is located inside the first housing member 12 and extends into the central housing member 16. A second shaft 20 is located inside the second housing member 14 and also extends into the central housing member 16. The first and second shafts 18, 20 are coupled to each other inside the central housing 16, as described below.

The first shaft 18 has a recess 18B formed in the second end thereof. The recess contains internal splines 26. The second shaft 20 has a first end 20A with a smaller diameter than the first shaft 18 which includes external splines 28. The external splines 28 are engaged with the internal splines 26 resulting in coupling of the first and second shafts 18, 20.

Accordingly, the first end 20A of the second shaft 20 is inserted into and meshingly engages the splined recessed second end 18B of the first shaft 18. In other words, the male first end portion 20A of the second shaft 20 engages in the female second end portion 18B of the first shaft 18. An inverted configuration is also possible.

Figure 4:
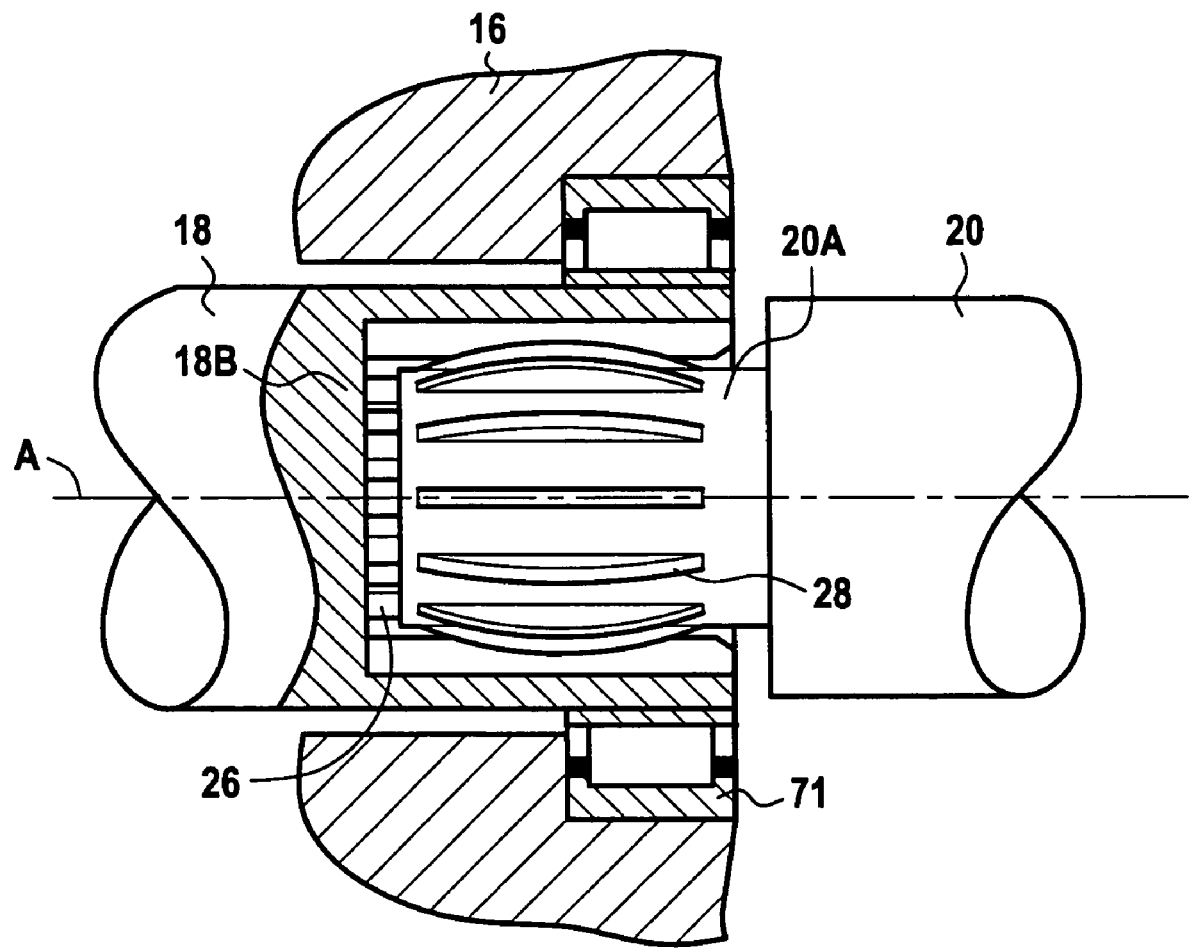
FIG. 4 is a detailed view of the shaft connection.

The region containing the splined connection of the first and second shafts 18, 20 is located inside the central housing 16. As best shown in FIG. 4, in order to compensate for any radial bending of the first shaft 18 relative to the second shaft 20, the external splines 28 of the second shaft 20 have a pitch diameter which is not constant but varies, and is modified by a radius (Rs), which is much larger than the diameter of the external splines 28. For example, Rs can be around 1000 mm. This results in spherically curved convex splines. Referring to FIG. 4, the male shaft end 20A has spherically curved convex teeth 28, whilst the female shaft end 18B has straight teeth 26.

A first cylinder block 36A is radially mounted on the first shaft 18 and a second cylinder block 36B is radially mounted on the second shaft 20. The first and second cylinder blocks 36A, 36B are both adapted to rotate with the shafts 18, 20.

A first swash plate 50A is operatively associated with the first cylinder block 36A, by means of a plurality of pistons 42, corresponding piston rods 44 and sliding plate 46. A second swash plate 50B is also operatively associated with the second swash plate 36B in the same manner.

The bearing arrangement will now be described. The first shaft 18 is mounted in the first housing 12 on a first bearing 30, and the second shaft 20 is mounted in the second housing 14 on a second bearing 32. The central region where the first and second shafts 18, 20 are interconnected is supported by a central bearing 34, which radially supports the second end portion 18B of the first shaft 18 inside the central housing 16. The central bearing 34 is located adjacent to the recessed portion of the first shaft 18 containing the splined connection, such that the bearing 34 surrounds the mesh zone of teeth 26 and 28. The bearing 34 extends substantially over the length of the coupling region between the first and second shafts 18, 20. For example, the bearing 34 extends between 50% and 100% of the length of the coupling region between the shafts 18, 20.

In an opposite shaft coupling arrangement not shown in the drawings, the shaft end 18B is a male splined portion. In this arrangement, the middle bearing 34 supports the second shaft 20 close to the region of meshing between of the first shaft 18 and the second shaft.

Due to the use of a single central bearing 34 for both shafts, the overall length (Ls) of the tandem pump unit 60 is shortened such that for equal displacements, the total tandem pump unit 60 length is significantly less than twice the length of a single pump of prior art design.

In this embodiment, the bearing 34 is a radial bearing. The radial bearing is formed by a hydrodynamic bearing or sliding bearing. The two shafts 18, 20 are hence supported by only three bearings 30, 32, 34.

As can be seen in FIG. 2. The two respective swash plates 50A, 50B are axially inclined in the same direction, for example by the same angle +β as shown.

A second embodiment of the pump unit 70 shown in FIG. 3 will now be described. Like reference numerals have been used to indicate like components. In this embodiment, the layout of the two pumps 22A, 22B is similar to that described above with reference to the first embodiment, however, the central bearing 71 in the coupling region of the two shafts 18, 20 is a single roller bearing.

Figure 3:
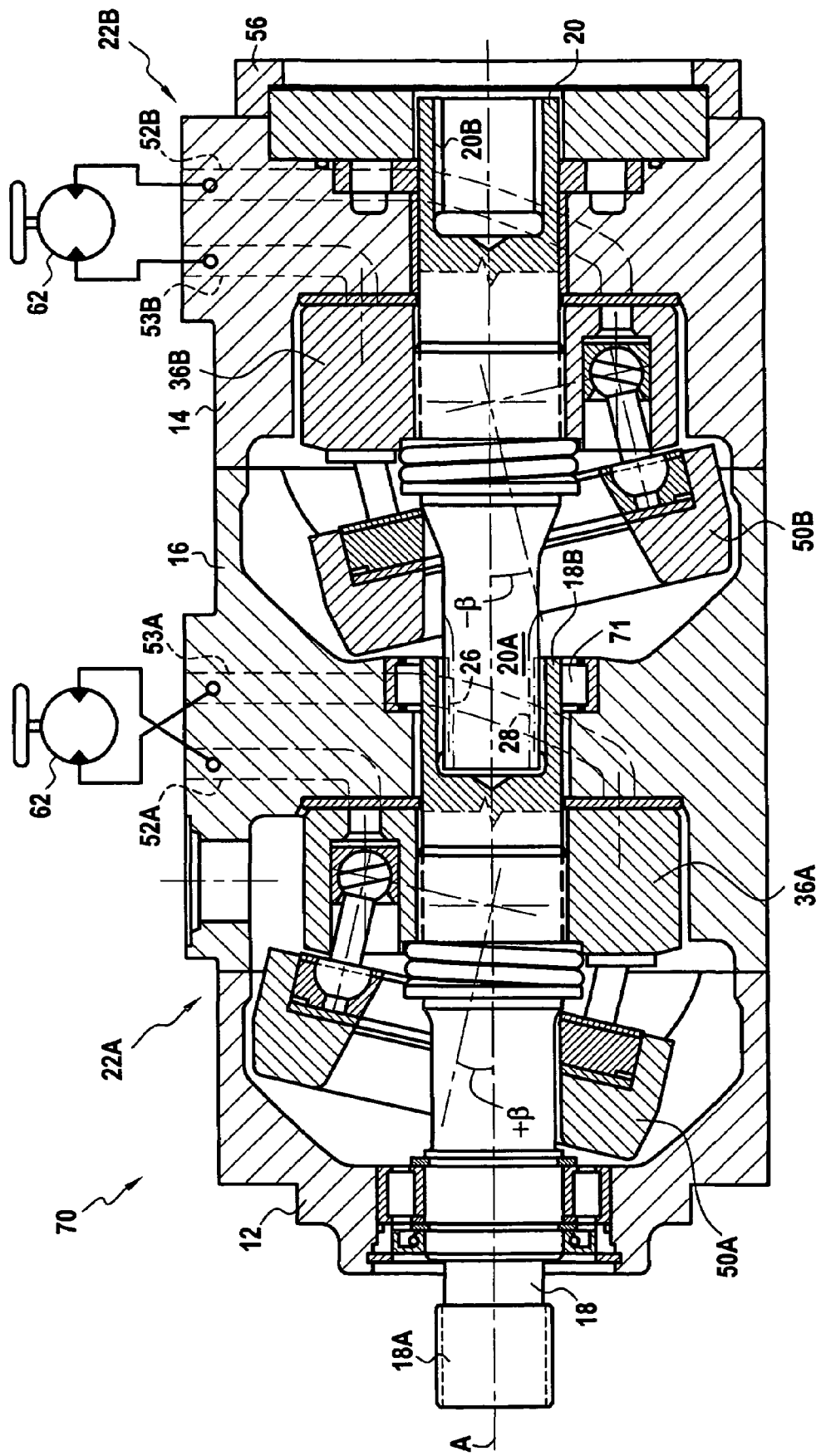
FIG. 3 is a cross-sectional view of a second embodiment of a tandem axial piston pump according to the present invention.

As shown in FIG. 3, the first swash plate 50A of the first pump 22A is inclined relative to the rotational axis of the shafts 18, 20 by an angle of +β, and the second swash plate 50B of the second pump 22B is inclined by an angle of −β. This results in the high and low pressure sides of each pump being inverted relative to each other. Consequently radial forces acting on the central bearing 71 and coming from the respective pumps 22A, 22B are respectively opposite in direction which results in a decrease in the radial forces acting on the central bearing 71. FIG. 3 schematically indicates two hydraulic motors 62 which are hydraulically connected to the output and inlet ports 52A, 52B, 53A, 53B of the pumps 22A, 22B.

One or more additional pumps of a different type or manufacturer can be selectively added to the unit 10. This is done by machining an additional recess with internal splines in the rear end 20B of the second shaft 20 and by attaching an appropriate flange 56 to the second housing member 14. A further pump (not shown) with a male splined shaft is then externally attachable to the unit 70, by a further splined connection. In such connection of additional pumps, it is necessary to pay attention to the shaft load, mainly due to torque, to avoid damage of the connected shafts.

Alternatively, in either of the first or second embodiments shown in FIG. 2 or 3, one or more additional central housing members 16 can be added to the unit 60, 70. In this way, one or more additional pumps of the same type can be added to the unit 60, 70 to be hydraulically connected to additional hydraulic motors as desired.

For example, it is possible to install two central housing members 16 between the first housing 12 and second housing 14 to obtain a pump unit (not shown) with three pumps, where two of them can be used for the transmission of a machine and the remaining one, for example, for a swing drive or a tool of the machine. The overall length (Ls) of such unit would be the same as or shorter than the length of a tandem pump unit with two pumps of prior art design.

Each additional pump that is added to the unit includes an additional shaft (not shown) that has a male splined end and a female splined end. The radial supporting of each additional pump requires only one extra bearing 34, 71 to be added to the unit 60, 70 described with reference to the second or third embodiments.

The operation of the pump unit 10 will now be described. Referring to FIG. 1, when the shaft 18 is coupled to an internal combustion engine, or other such power source, the shaft 18 can be rotationally driven.

By rotation of the shaft 18, the cylinder block 36 is also rotationally driven. Each piston 42 is also forced to rotate about the axis of the shaft 18. Each piston 42 is mechanically connected to the slide plate with a spherical joint ending by a synchronization pin 54. Accordingly, during the course of one complete revolution of the shaft 18, each piston 42 axially reciprocates inside the cylinder 40. This causes suction of the working fluid from the input port (52 or 53) to the cylinder and then its evacuation to the output port (53 or 52).

For each of the two embodiments of the tandem axial pump unit 60, 70 shown in FIGS. 2 and 3, the same basic operation of each pump 22A, 22B applies. The splined coupling between the first and second shafts 18, 20 permits those shafts to be driven at the same rotational speed.

The amount of hydraulic fluid that is pumped during each rotation of the shafts 18, 20 is dependent upon factors such as the number of cylinders, the diameter of the cylinders, the angle of inclination of the swash plates 50A, 50B (which inclination can be changed by conventional means, not shown), and the speed of rotation of the shafts 18, 20.

Considering that the tandem pump unit 60, 70 is driven by an engine and that each pump feeds a hydraulic motor 62, which is hydraulically connected to the main ports 52, 53 the hydraulic motors 62 create a load, which is transformed into a high pressure in the feeding distribution channel.

This pressure is also transferred into the cylinders 40, where it acts on each piston 42, which creates a radial load between each piston 42 and cylinder 40. This radial load is subsequently transferred from a cylinder block 36A, 36B to the corresponding first shaft 18 or second shaft 20.

The radial load on the first shaft 18 is transmitted into the first bearing 30 and into the central bearing 34. The radial load on the second shaft 20 is transmitted into the second bearing 32 and through the external splines 28 into the internal splines 26 of the first shaft 18.

Referring to FIG. 2, if the inclination of the swash plates 50A, 50B is in the same direction for both pumps, for example at angles (+β, +β) and both pumps work in the same mode, for example in the pump mode, the radial loads transmitted from both shafts 18, 20 into the central bearing 34 are summed.

With the swash plates 50A, 50B inclined in opposite directions, the radial loads transmitted to the central bearing are opposite and are subtracted from each other so that the central bearing is less loaded. For example with the swash plates having equal inclinations defined by the respectively angles (+β) and (−β), as shown in FIG. 3, the radial loads from the first shaft 18 and second shaft 20 transmitted into the central bearing 34 are opposite and eliminate each other. In practice this effect can be used in applications for the most common working mode, for example for the hydrostatic transmission of a vehicle in forward direction, where the first pump 22A drives the right hand side motors and the second pump 22B drives the left hand side motors. In this mode, the pumps 22A, 22B will have opposite swash plate 50A, 50B inclination angles +β, −β. This effect increases the lifetime of the central bearing 34.

The invention claimed is:
1. A hydraulic machine comprising a housing and at least first and second hydraulic units, each unit comprising a cylinder block located in the housing having pistons, a shaft in rotational engagement with the cylinder block, and feed and exhaust ports for fluid exchange; said shafts being arranged coaxially and being coupled by corresponding male and female splined end portions thereof engaged one in the other so that said shafts rotate together, the machine further comprising bearings for supporting the shafts in the housing, said bearings comprising first and second bearings for respectively supporting the shafts at portions thereof located on the other sides of the cylinder blocks with respect to said splined end portions, wherein the bearings further comprise a single third bearing at the overlap section of the splined end portions of the shafts, which engages one of the shafts at least at the overlap section of the splined end portion thereof supporting the shafts between said cylinder blocks, the feed and exhaust ports of one of said units being disposed radially around said third bearing.

2. The hydraulic machine according to claim 1, wherein the first hydraulic unit includes a first swash plate, and the second hydraulic unit includes a second swash plate and each piston is connected to one of said first and second swash plates and adapted to reciprocate on an axis parallel to the axis of the shafts.

3. The hydraulic machine according to claim 2, wherein each swash plate is adapted to be axially inclined relative to the rotational axis of the shafts.

4. The hydraulic machine according to claim 1, wherein each hydraulic unit is a pump.

5. The hydraulic machine according to claim 1, wherein the third bearing is constituted by a roller bearing.

6. The hydraulic machine according to claim 1, wherein the third bearing is constituted by a radial hydrodynamic bearing.

7. The hydraulic machine according to claim 1, wherein the first bearing is a roller bearing, and the second bearing is a radial hydrodynamic bearing.

8. The hydraulic machine according to claim 1, wherein the third bearing arrangement supports the shaft comprising the female splined portion at a coupling region of the first and second shafts.

9. The hydraulic machine according to claim 1, wherein the pitch diameter of the splines of the male splined end portion varies so as to allow an angular inclination of the two shafts coupled by said splines.

10. The hydraulic machine according to claim 2, wherein the first swash plate is located between the first bearing and the first cylinder block, and the second swash plate is located between the third bearing and the second cylinder block.

11. The hydraulic machine according to claim 10, wherein an angle of inclination of the first swash plate is of opposite direction to an angle of inclination of the second swash plate.

12. The hydraulic machine according to claim 1, wherein the housing comprises three parts, each part providing a seat for one of the first, second and third bearings.

13. The hydraulic machine according to claim 2, wherein a first cylinder block of the first hydraulic unit is adapted for exchanging fluid through feed and exhaust ports provided in a central part of the housing, said central part extending radially around said third bearing, said central part being disposed directly between a distribution plate of said first cylinder block and said second swash plate.

14. The hydraulic machine according to claim 2, wherein said cylinder blocks and said swash plates of said hydraulic units are disposed along said axis in the following order: cylinder block-swash plate-cylinder block-swash plate.

* * * * *